United States Patent [19]

Traficante

[11] Patent Number: 4,544,390
[45] Date of Patent: Oct. 1, 1985

[54] CRYOGENIC PRODUCTION OF AMMONIA SYNTHESIS GAS

[75] Inventor: Daniel Traficante, Boonton, N.J.

[73] Assignee: Exxon Research & Engineering Co., Florham Park, N.J.

[21] Appl. No.: 582,915

[22] Filed: Feb. 23, 1984

Related U.S. Application Data

[63] Continuation of Ser. No. 465,840, Feb. 14, 1983.

[51] Int. Cl.⁴ .................................................. F25J 3/02
[52] U.S. Cl. ........................................... 62/20; 62/31; 62/34; 62/39
[58] Field of Search .................. 62/38, 39, 9, 11, 23, 62/24, 31, 32, 34, 36, 42, 44, 17, 20

[56] References Cited

U.S. PATENT DOCUMENTS

| | | | |
|---|---|---|---|
| 3,312,075 | 4/1967 | Becker | 62/20 |
| 3,327,487 | 6/1967 | Karwat et al. | 62/13 |
| 3,508,413 | 4/1970 | Pryor | 62/24 |
| 3,543,529 | 12/1970 | Knapp et al. | 62/38 |
| 3,691,779 | 9/1972 | Meisler et al. | 62/23 |
| 3,872,025 | 3/1975 | Singleton | 252/373 |
| 4,217,759 | 8/1980 | Shenoy | 62/27 |

OTHER PUBLICATIONS

A. Joly and R. Clar, "New Integrated Cryogenic Units for Ammonia Synthesis", *Nitrogen*, No. 52, pp. 30–43 (Mar./Apr. 1968).
M. Venkataratnam and T. S. N. Murty, "Production of Synthesis Gas Mixture From Converted Gas For Ammonia Manufacture–Different Cycles/Schemes", *Indian J. Cryog.*, pp. 1–6 (1982).

*Primary Examiner*—Frank Sever
*Attorney, Agent, or Firm*—Jack B. Murray, Jr.

[57] ABSTRACT

An improved cryogenic separation process is provided for forming a substantially CO-free and lower hydrocarbon-free hydrogen-rich gas, suitable for use in producing an ammonia synthesis gas, from a hydrogen-containing gas stream also containing carbon monoxide and lower hydrocarbon impurities, wherein the hydrogen containing gas is subject to a two-stage autorefrigerated cryogenic flash treatment to remove concentrated methane-containing and carbon monoxide-containing streams, and the thus-purified hydrogen gas is passed to a nitrogen wash tower in counter-current contact with liquid nitrogen to form the desired hydrogen-rich product streams as an overheads from the wash tower.

18 Claims, 2 Drawing Figures

CRYOGENIC PRODUCTION OF AMMONIA SYNTHESIS GAS

This is a continuation of application Ser. No. 465,840 filed Feb. 14, 1983.

BACKGROUND OF THE INVENTION

1. Field of the Invention

This invention generally relates to the production of an ammonia synthesis gas, and more particularly, to an improved cryogenic process employing liquid nitrogen washing.

2. Description of the Prior Art

In the production of ammonia, an ammonia synthesis gas containing hydrogen and nitrogen in approximately a 3:1 ratio is required. A hydrogen-rich gas stream is usually employed as a raw feed which must then be purified and combined with the required amount of nitrogen. The sources of such hydrogen-rich gas feeds vary widely, but typically the hydrogen gas feed will contain high boiling impurities such as $CO_2$, higher boiling hydrocarbons, hydrogen sulfide, moisture, lower boiling hydrocarbons such as methane, carbon monoxide and nitrogen. Warm temperature processes which are known in the art are typically used to remove the higher boiling impurities such as $CO_2$, the higher boiling hydrocarbons, $H_2S$, moisture and the like, and various cryogenic systems have been developed to effect the final purification by removing lower boiling impurities such as the lower boiling hydrocarbons (e.g., methane), carbon monoxide and the like.

U.S. Pat. No. 3,312,075 relates to a classic nitrogen wash system in which liquid nitrogen is produced and employed in a nitrogen wash tower for countercurrent contact of a cooled crude hydrogen-containing gas feed to remove carbon monoxide and other impurities. The vapors withdrawn from the upper portion of the nitrogen wash tower comprised the purified hydrogen stream and are combined with liquid nitrogen for additional refrigeration and then passed in indirect heat exchange for cooling of the feed gas streams, namely, the nitrogen gas stream and the crude hydrogen-containing gas feed. The process obtains the necessary cooling by an isentropic expansion of the hydrogen:nitrogen product stream. The impure nitrogen liquid stream withdrawn from the bottom portion of the nitrogen wash tower is passed through a pressure release valve to provide further refrigeration to the process. All of the non-hydrogen feed components are withdrawn via the waste nitrogen stream.

U.S. Pat. No. 3,327,487 is exemplary of multi-bed pressure swing absorption. This process employs switching exchangers to remove impurities other than carbon monoxide (by absorption) and expands crude hydrogen streams to obtain additional refrigeration. Crude (partially purified) hydrogen is reheated before recooling and washing with nitrogen, thereby providing heat inefficiencies in this system. Also, this process results in $H_2$ losses, since the non-$H_2$ components are separated as a single stream which contains as much as 20 wt. % of the $H_2$ passed to the process. This process is very complex and extremely cross-integrated. In addition, without adequate surge volumes, product and-/or waste flows could be cyclical, providing instabilities in the operation of such a process. The complexities of the process require cycling and precise control of timing of the varied cycles.

U.S. Pat. No. 3,508,413 employs sub-atmospheric flashes to obtain refrigeration, which increases the chance of dangerous air leakages into the system. Such air leakages are to be avoided due to the ever-present danger of explosions from the highly combustible gas mixtures. The gaseous product which is produced via the multi-phase flash and fractionating tower system does not achieve low levels of carbon monoxide in the hydrogen product stream, which contains about 2.5 percent of CO. This process cannot be successfully employed with high methane hydrogen feeds since $CH_4$ would condense in the fractionating tower reboiler (line 13 in the patent's FIG. 1) and be transferred to the intermediate tower reflux (line 27), thereby contaminating the $H_2$ overhead product. Again, refrigeration is provided by isentropic expansion of the hydrogen product stream.

U.S. Pat. No. 3,691,779 produces a high purity, 97–99.9 percent hydrogen product, and employs an isentropic expansion of a hydrogen product stream to provide a portion of the refrigeration. The impurities in the hydrogen containing gas feed are removed by a series of cooling and condensation stages having successively lower temperatures, and the process is therefore basically a pressure swing absorption system. As a result of the expansion and recycle of a portion of the hydrogen product stream to refrigerate and regenerate the pressure swing absorption beds, a portion (e.g., 10–20%) of the hydrogen is lost to waste gas.

U.S. Pat. No. 3,872,025 liquefies a portion of the $H_2$-rich feed gas to remove a portion of the carbon monoxide therefrom and then fractionates the remaining portion to provide a pure carbon monoxide stream which is then employed after pumping and expansion to provide refrigeration to the process.

U.S. Pat. No. 4,217,759 employs an isentropic expansion of the product hydrogen stream to obtain refrigeration and also employs a sub-atmospheric flash treatment, which raises the dangers discussed above for oxygen leakages into the system.

SUMMARY OF THE INVENTION

An improved cryogenic separation process is provided for forming a substantially CO-free and lower hydrocarbon-free hydrogen-rich gas, suitable for use in producing an ammonia synthesis gas, from a hydrogen-containing gas stream also containing carbon monoxide and lower hydrocarbon impurities, wherein the hydrogen containing gas is subject to a two-stage autorefrigerated cryogenic flash treatment to remove concentrated methane-containing and carbon monoxide-containing streams, and the partially purified hydrogen gas thereby formed is passed to a nitrogen wash tower in countercurrent contact with liquid nitrogen for final purification and to form the desired hydrogen-rich product stream as an overhead from the wash tower.

The improved separation process of this invention produces a hydrogen-rich stream which can be blended with nitrogen to form an ammonia synthesis gas containing essentially no carbon monoxide or methane contamination, and forms the hydrogen-rich stream without the substantial hydrogen losses of the prior art processes. In addition, the process of this invention provides separate methane-and carbon monoxide-containing gases which have fuel value. The absence of such impurities in the hydrogen-rich product stream reduces or eliminates the need for a purge stream in a subsequent ammonia synthesis reactor/ammonia recovery system to avoid build-up of such impurities in this system.

DETAILED DESCRIPTION OF THE INVENTION

While the process of this invention is applicable for forming a hydrogen-rich stream substantially free of CO and methane impurities, which product gas has a variety of end uses, the resulting hydrogen-rich stream is particularly adapted for use in synthesis of ammonia, and the following discussion, therefore, describes the present invention, particularly with respect to formation of an ammonia synthesis gas by blending the thus-produced hydrogen-rich product stream with gaseous nitrogen in proportions suitable for ammonia synthesis.

Figure 1:
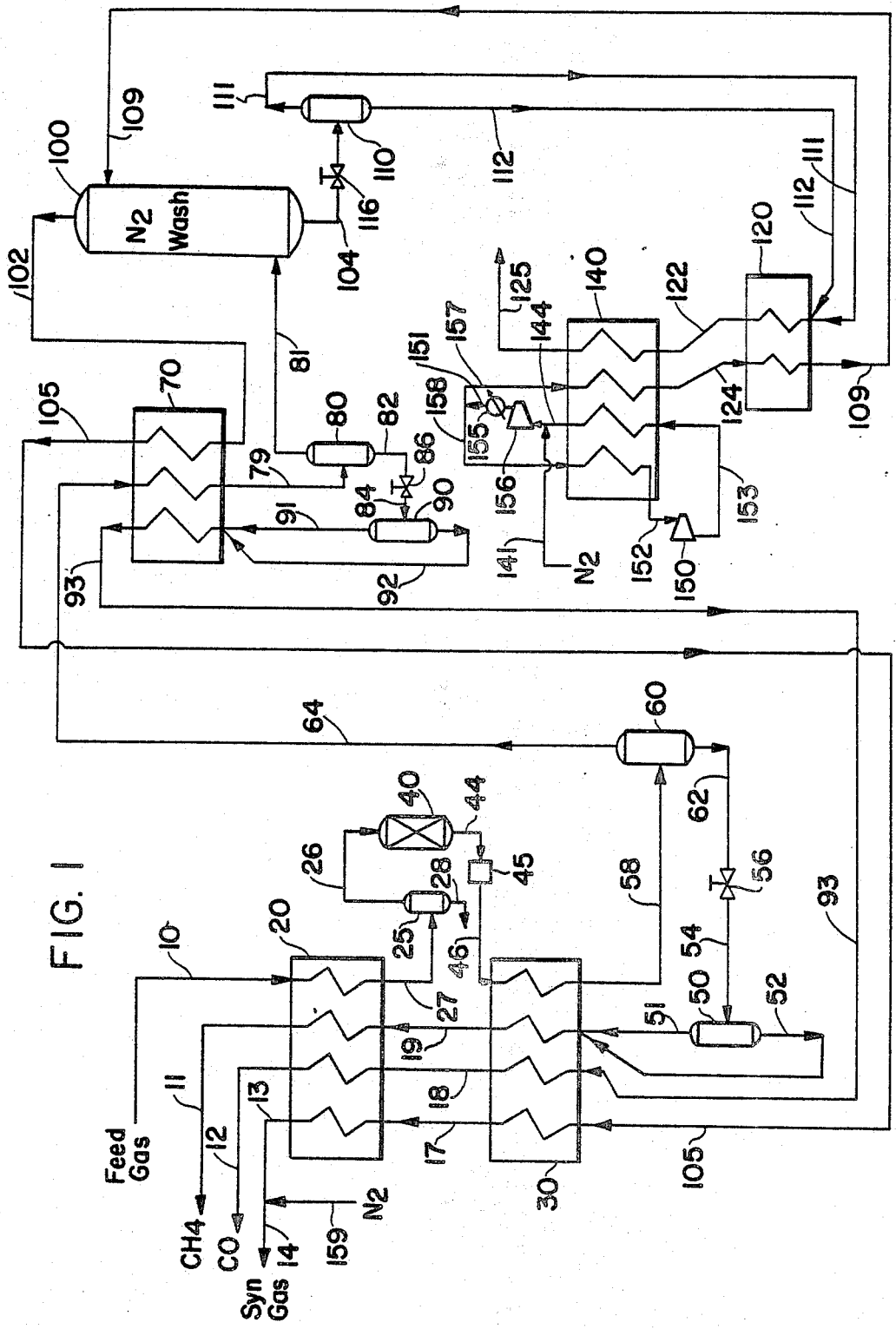
FIG. 1 is a schematic illustration of one embodiment of the process of this invention.

Referring to FIG. 1, wherein one embodiment of the cryogenic separation process of this invention is illustrated, a feed gas comprising hydrogen, carbon monoxide and lower hydrocarbons (principally methane) is passed via conduit 10 to first cooling zone 20, which can comprise any conventional heat exchanger such as a plate-fin exchanger, wherein the feed gas is cooled. The feed gases which can be treated according to the process of this invention can vary widely in composition. Generally, this gas stream will contain from about 50 to 75 vol. % hydrogen, and preferably from about 60 to 70 vol. % hydrogen; from about 15 to 30 vol. % carbon monoxide, and more typically from about 20 to 25 vol. % carbon monoxide; and from about 1 to 25 vol. % methane, more typically from about 10 to 20 vol. % methane. In addition, the feed gas stream can contain other impurities such as paraffins having from 2 to 3 carbon atoms per molecule, alkenes having from 2 to 3 carbon atoms per molecule (most typically ethane, acetylene, ethylene, propane and propylene), mercaptans, $CO_2$, $H_2S$, COS, $CS_2$, $NH_3$ and HCN, which impurities will generally be present in a total amount of less than about 0.01 vol. %. Thus, the instant process is suited to separate hydrogen from an intermediate BTU gas stream resulting, for example, from the gasification of lignite. Feedstream 10 is preferably essentially free of $CO_2$ and $H_2S$, i.e., contains not greater than about 0.005 vol. % $CO_2$ and not greater than about 0.001 vol. % $H_2S$.

Prior to introduction into first cooler 20, the feed gas in stream 10 is preferably compressed (using a conventional compressor, not shown) to a pressure of at least about 800 psig, more typically from about 900 to 1100 psig. The feed gas can be introduced to first cooler 20 at ambient temperature, and generally from about 70° to 130° F., and the gas stream is cooled in first cooler 20 to a temperature of from about −50° to −90° F., more typically from about −60° F. to −80° F., by indirect heat exchange with cooling gases introduced thereto via conduit 17, 18 and 19, as will be described in more detail below. The resulting precooled feed gas is withdrawn from first cooler 20 via conduit 27 and introduced, after first passing through knock-out drum 25 in order to prevent liquids from passing into conventional adsorber 40 (liquids being withdrawn via conduit 28 from drum 25), to adsorber 40 via conduit 26 for adsorption of trace components having normal boiling points higher than CO, $CH_4$ and $H_2$, such as ethane/ethylene, propane/propylene, and other heavier hydrocarbons, and $CO_2$, COS, $H_2S$, and $H_2O$, which could deposit as solids in, and therefore foul, downstream cryogenic processing equipment. If feedstream 10 contains more than about 0.01 vol. % of the other impurities discussed above, such as the paraffins and alkenes of from 2 to 3 carbons, mercaptans and the like, the liquids withdrawn via conduit 28 can be combined with the $CH_4$-rich stream 19 and passed to first cooler 20 for recovery of at least a portion of the refrigeration in stream 28 and for ultimate removal from the system with methane-stream 11.

The amount and type of adsorbing medium used in adsorber 40 is not critical and can typically comprise a solid conventional adsorbent such as alumina, activated carbon, charcoal and molecular sieves or a combination of these adsorbents. The resulting treated gas is withdrawn via conduit 44 and is preferably passed first through filter 45 to remove any solids that may have been entrained in gases exiting adsorber 40, and the filtered gases are then introduced via conduit 46 to second cooler 30 wherein the filtered feed gas is further cooled, generally to a temperature of from about −220° to −280° F., and more preferably from about −240° to −260° F., in order to condense at least a portion, preferably a major portion (i.e., 50 wt. % or greater), and most preferably at least about 75 wt. %, of the methane content thereof. The resulting two-phase fluid, containing the condensed methane and uncondensed gases, is withdrawn via conduit 58 and passed to vapor/liquid separator 60 for recovery of a separated gas stream 64 and liquid stream 62. Liquid stream 62 comprises the methane condensate and is withdrawn from separator 60 and passed through a Joule Thompson valve 56 to lower the pressure by an amount sufficient to provide a refrigerated, flashed stream containing a mixture of gas and liquid which is then passed via conduit 54 to vapor/liquid separator 50. The construction of valve 56 is conventional, and is preferably employed so as to provide a flashed two-phase fluid having a temperature of at least 3° F., and more typically from about 5° to 15° F., lower than stream 62.

The thus-cooled, two-phase stream 54 is passed into separator 50 to form separate vapor stream 51 and liquid stream 52 which are preferably then recombined for introduction into the second cooler 30 to provide at least a portion of the cooling fluid passed thereto. The now gaseous hydrocarbon stream is withdrawn from cooler 30 via conduit 19 and passed to first cooler 20 for pre-cooling of the feed gas in indirect heat exchange therewith, as described above. The thus-exchanged methane stream can be withdrawl form first exchanger 20 via conduit 11. This methane stream will generally comprise 5–10% $H_2$, 25–45% CO, 40–60% $CH_4$, and essentially all $C_2$ and higher hydrocarbons remaining in gas stream 46.

The pre-cooling effected in first cooler 20 and the condensation and further cooling effected in second cooler 30 can be performed in a single heat exchanger if feed gas stream 10 is sufficiently free of the aforementioned impurities which are removed in separator 40. Such a feed gas stream can be provided, for example, by initially treating stream 10 in a similar adsorber 40, prior to introduction to the heat exchanger for removal of the lower hydrocarbons and other impurities. This embodiment is not preferred, however, since a larger volume of adsorbent will be generally required for treating of feed gases at ambient temperature than is necessary for adsorbing such trace impurities from a pre-cooled feed gas as is illustrated in FIG. 1.

The gases in stream 64 which comprises hydrogen, carbon monoxide and trace methane, is passed to third heat exchanger 70 for cooling by indirect heat exchange with the overhead product 102 from nitrogen wash tower 100 and the vapor and liquid carbon monoxide streams withdrawn from separator 90, each of which will be more fully discussed below. Stream 64, generally having a temperature of from about −220° to −280° F., and more preferably from −240 to −260° F., is cooled in third heat exchanger 70 (generally to a temperature of −280° to −320° F. or below) so as to condense at least a major portion, and preferably at least about 90 wt. %, of the carbon monoxide and remaining methane and to form a two-phase stream 79 which is then passed to a vapor/liquid separator 80. Liquid withdrawn from separator 80 via conduit 82 comprises the condensed carbon monoxide and remaining methane and is flashed across Joule Thompson valve 86 to provide a refrigerated, two-phase stream 84, which preferably has a temperature not more than about 3° F., more typically not more than about 1° F., higher than that of stream 82. Two-phase stream 84 is introduced to vapor/liquid separator 90, and the resulting liquid 92 and vapor 91 are recombined and passed serially to third exchanger 70 and thence as a gaseous stream via conduit 93 to second cooler 30, followed by introduction via conduit 18 to first cooler 20. The CO/hydrocarbon vapor is finally withdrawn from the process via conduit 12. The thus-produced carbon monoxide stream typically comprises 5–15% $H_2$, 55–85% CO, 15–25% $CH_4$, and trace amounts of $C_2$ and higher hydrocarbons.

The vapor in conduit 81, now substantially depleted of carbon monoxide and methane, comprises gaseous hydrogen and is introduced into the lower portion of nitrogen wash tower 100 for countercurrent scrubbing of the hydrogen gases with liquid nitrogen which is formed in wash tower 100 as a result of a decrease in the partial pressure of the $N_2$ which is introduced as a critical fluid into the upper portion of tower 100 via conduit 109. In wash tower 100, any remaining impurities in the hydrogen feedstream, such as carbon monoxide and trace methane, are scrubbed from the gas and withdrawn in liquid nitrogen via conduit 104. The thus-withdrawn liquid bottoms is also flashed across Joule Thompson valve 116 into vapor/liquid separator 110 to provide at least about 0.5° F., more typically from about 1° to 5° F., of refrigeration in the thus-produced, two-phase fluid. The resulting vapor 111 and liquid 112 withdrawn from separator 110 are then preferably recombined and passed to fourth cooler 120 for sub-cooling of liquid nitrogen which is introduced thereto via conduit 124, as will be described in more detail below. Thereafter, the nitrogen wash tower bottoms is introduced via conduit 122 into fifth cooler 140 and finally withdrawn from the process as a gas via conduit 125.

The overheads product from nitrogen wash tower 100 is withdrawn via conduit 102 and comprises gaseous hydrogen which is essentially free of carbon monoxide, methane and other impurities and generally comprises from about 85 to 96 vol. %, and preferably from about 90–95 vol. %, gaseous hydrogen, from about 4 to 15 vol. %, preferably from about 5 to 10 vol. %, nitrogen and less than 0.01 vol. % of other gases (principally inert gases such as argon and helium). The hydrogen-rich stream 102 contains less than about 5 parts per million by volume of CO and also contains less than about 5 parts per million by volume of methane. This gas stream, which generally has a temperature of from about −320° to −330° F., is passed serially through third cooler 70, second cooler 30, and first cooler 20 via conduits 105 and 17 to provide at least a portion of the cooling gases introduced to each such cooler. The hydrogen gas stream is ultimately withdrawn from pre-cooler 20 via conduit 13 and is admixed with suitable amounts of gaseous nitrogen, which can be introduced thereto via conduit 159, to form ammonia syn gas stream 14, which will typically contain a molar ratio of hydrogen to nitrogen of from about 2.5:1 to 3.5:1. This ammonia syn gas stream can then be employed in the synthesis of ammonia, using conventional techniques.

The nitrogen which is employed as wash liquid in tower 100 is formed in a series of coolers 140 and 120. Feed nitrogen is introduced to the process via conduit 141, combined with recycled nitrogen in conduit 144 and then compressed in compressor 156 and cooled in condenser 155 (generally from a temperature of from about 300° to 400° F. to a temperature of from about 100° to 120° F.) to remove the heat of compression. The compressed nitrogen stream is then split into two portions. A first portion passes into conduit 158 for return to cooler 140 in the nitrogen cooling loop. A second portion, which generally comprises from about 25 to 45 vol. % of the thus-produced compressed stream, is passed to conduit 157 and returned to cooler 140 for further cooling and liquefaction of the nitrogen gas. In the fifth cooler 140, the $N_2$ is cooled in indirect heat exchange with nitrogen wash tower bottoms 122 and refrigerated, nitrogen recycle stream 153 which is itself formed by expanding the combined recycle/nitrogen feedstream after it is passed through and withdrawn from cooler 140 via conduit 152, the expansion being provided by conventional expansion turbine 150. The cooled, expanded nitrogen stream is reintroduced via conduit 153 to cooler 140 and, after passing therethrough, is combined with fresh $N_2$ and recompressed as described above.

The nitrogen which is thus produced is withdrawn from cooler 140 via conduit 124 at a temperature of from about −280° to −315° F. and is passed to sub-cooler 120 wherein it is cooled to a temperature of from about −290° to −320° F. in indirect heat exchange with the combined liquid 112 and vapor 111, as described above. The sub-cooled nitrogen is withdrawn as a critical fluid from cooler 120 via conduit 109 and is passed to tower 100 for scrubbing of the hydrogen gas introduced to the lower portion of that tower.

In the practice of this process, it is important to maintain superatmospheric pressures at all points in the process in order to prevent air from leaking into the system and providing the explosion hazards which this can entail. Thus, the system pressure in the process equipment and conduits of this invention such as vessels 40, 60, 80 and 100 and conduits 10, 64, 109, 81, 79, 58, 102, 105 and 13, which treat or transport any part of the $H_2$ feed or $H_2$-rich gas will generally range from about 800 to 1100 psig, as will, necessarily, vessels such as separator 110 and conduits 109 and 144 which transport or treat the compressed $N_2$-wash stream or bottoms streams. Of course, the flashed vapor and liquid streams 51/52, 91/92 and 111/112 can be subjected to lower pressures, but these lower pressures will generally be maintained at a level of at least about 0.2 psig.

The recombination of vapor and liquid streams 51/52, 91/92 and 111/112 before entry into coolers 30, 70 and 140, respectively, is preferred in order to provide more even distribution of vapor and liquid flows through the respective exchangers. However, this is not required and these vapors and liquids can be passed separately through the respective coolers. For example, the H$_2$-rich vapor 51 can be serially passed to coolers 30 and 20 through a separate conduit (not shown) and then a portion (or all) thereof can be combined with the feed gas in conduit 10 for enhanced H$_2$ recovery in the process.

Figure 2:
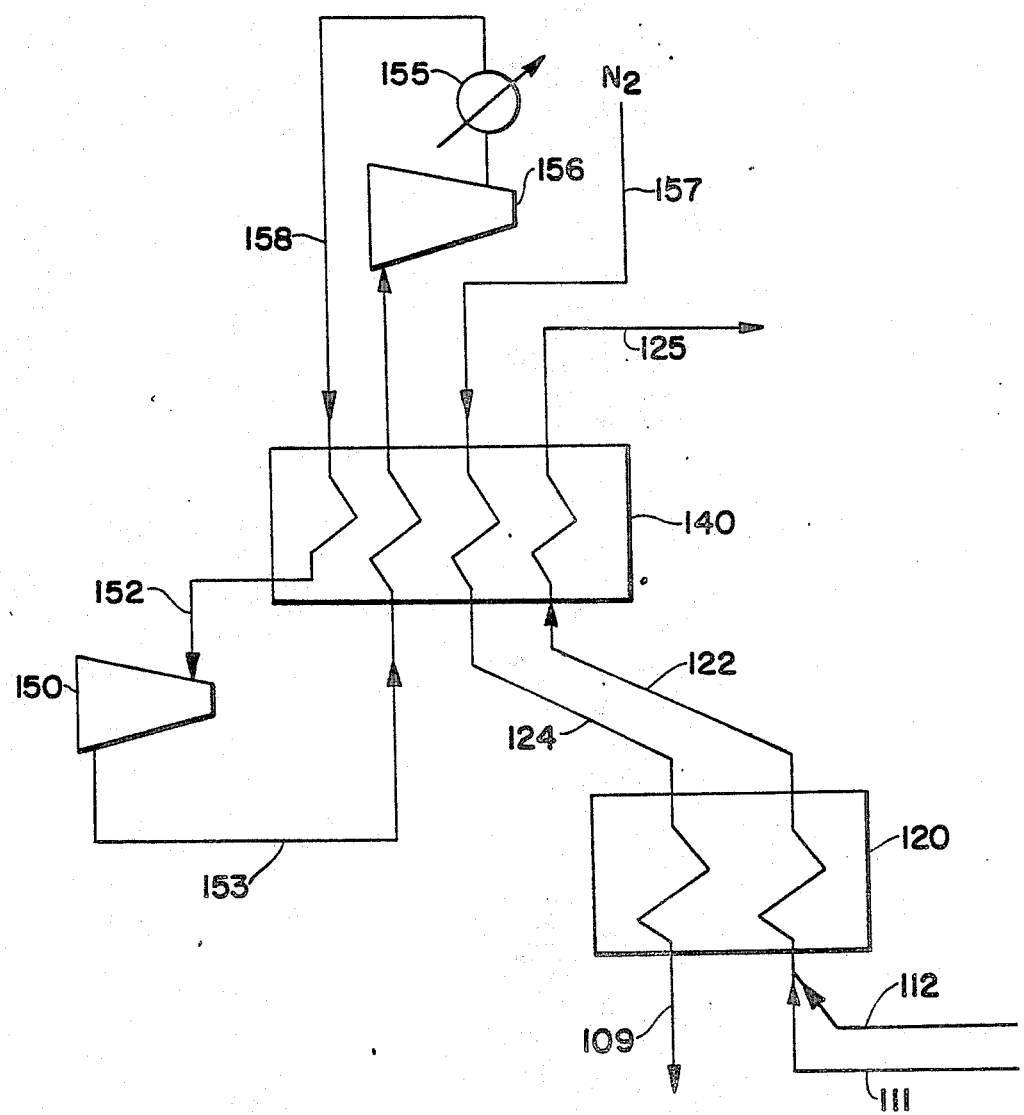
FIG. 2 is a schematic illustration of an alternative $N_2$ cooling loop which can be employed in the process of this invention.

FIG. 2 illustrates yet another embodiment of this invention which employs a nitrogen cooling section using a closed-loop nitrogen cooling cycle. In this embodiment, feed nitrogen, compressed to system pressure (by means of the compressor, not shown) is passed (e.g., at ambient temperature) to cooler 140 via conduit 157 wherein it is liquefied in indirect heat exchange with streams 153 and 122 to form a liquid nitrogen stream 124 which is then sub-cooled in sub-cooler 120 to form the sub-cooled nitrogen stream 109 for passing to nitrogen wash tower 100. In this embodiment, the feed nitrogen is introduced directly to cooler 140, and the recompressed nitrogen exiting compressor 156 and cooler 155 is entirely recycled via conduit 158 to cooler 140 and subsequently expanded in turbine 150 and returned to cooler 140 as described below.

The hydrogen-rich gas stream 13 formed by the process of this invention effects recovery of from 85 to 98 vol. % of the hydrogen passed to the process via feed gas stream 10, while at the same time forming separate methane-rich and carbon monoxide-rich streams which recover from about 75 to 85 vol. % of the methane and 25 to 60 vol. % of the carbon monoxide, respectively, passed to the process via feed gas 10. Another advantage of the process of this invention, particularly with respect to the intended end use of the hydrogen-rich gas in ammonia synthesis, is that the remaining component of the hydrogen-rich gas is nitrogen and no further separation of the hydrogen from the nitrogen component is required prior to use of the hydrogen-rich stream in ammonia synthesis.

The improved cryogenic process of this invention can be further illustrated by reference to the following example.

EXAMPLE

Employing the improved cryogenic process of this invention as illustrated in FIG. 1, a hydrogen-containing feedstream having the indicated composition is treated for removal of non-hydrogen impurities, thereby forming a substantially pure hydrogen-containing gas stream which is admixed with nitrogen to form an ammonia syn gas.

Table I below gives a summary of the various flow streams' temperature and pressure, in addition to enthalpy, molecular weight, density, viscosity, mass hourly flow rates and stream compositions.

TABLE I

| STREAM | No. | Press. (psia) | Temp. (°F.) | Phase | Enthalpy (MBTU/hr.) | Molec. Wt. (LB/LB-MOL) | Density (LB/FT$^3$) | Viscosity (cp.) | Flow Rate (LB-MOL/hr.) |
|---|---|---|---|---|---|---|---|---|---|
| Feedstream | 10 | 1024.7 | 40.0 | V | 139.555 | 10.211 | 1.463 | 0.015 | 28783 |
| 1st Flashed Vapor | 64 | 1019.7 | −250.0 | V | 42.736 | 7.127 | 3.460 | 0.008 | 21595 |
| Tower Feed Vapor | 81 | 1014.7 | −320.0 | V | 160938 | 2.969 | 2.089 | 0.005 | 17139 |
| Washed H$_2$ Vapor | 102 | 1009.7 | −323.1 | V | 17.846 | 3.68 | 2.723 | 0.006 | 17513 |
| H$_2$ Vapor | 105 | 1004.7 | −262.0 | V | 25.890 | 3.68 | — | — | 17513 |
| H$_2$ Vapor | 13 | 999.7 | 35.0 | V | 61.245 | 3.68 | — | — | 17513 |
| N$_2$ | 159 | 999.7 | 110.07 | V | 30.453 | 28.044 | — | — | 4366.3 |
| Syn Gas Product | 14 | 999.7 | 49.0 | V | 92.294 | 8.535 | 1.512 | 0.015 | 21879 |
| 1st Separator Draw | 62 | 1019.7 | −250.0 | L | 18.070 | 19.476 | 30.315 | 0.075 | 7118 |
| CH$_4$ Flash Vapor | 51 | 175.0 | −250.0 | V | 3.436 | 14.023 | 1.227 | 0.007 | 1212.2 |
| CH$_4$ Flash Liquid | 52 | 175.0 | −259.0 | L | 14.634 | 20.582 | 33.077 | 0.099 | 5975.9 |
| CH$_4$ Product | 11 | 170.0 | 35.0 | V | 52.259 | 19.476 | — | — | 7188 |
| 2nd Separator Draw | 82 | 1014.7 | −120.0 | L | 6.941 | 23.116 | 42.280 | 0.143 | 4456.7 |
| CO Flash Vapor | 91 | 34.7 | −319.0 | V | 0.911 | 8.146 | 0.190 | 0.005 | 545.7 |
| CO Flash Liquid | 92 | 34.7 | −319.0 | L | 6.010 | 25.204 | 45.836 | 0.170 | 3911.0 |
| CO Stream | 93 | 29.7 | −262.0 | V | 19.182 | 23.116 | — | — | 4456.7 |
| CO Product | 12 | 24.7 | 35.0 | V | 28.698 | 23.116 | — | — | 4456.7 |
| Wash Tower Bottoms | 104 | 1014.7 | −321.5 | L | 1.250 | 24.452 | 44.150 | 0.118 | 836.88 |
| Btms Flash Vapor | 111 | 34.7 | −322.2 | V | 0.253 | 8.770 | 0.210 | 0.005 | 143.34 |
| Btms Flash Liquid | 112 | 34.7 | −322.2 | L | 0.997 | 27.693 | 50.161 | 0.154 | 693.54 |
| Btms Product | 125 | 24.7 | 105.0 | V | 5.402 | 24.452 | — | — | 836.88 |
| Fresh N$_2$ Feed | 141 | 14.9 | 90.0 | V | 24.328 | 28.04 | — | — | 1211.2 |
| Expander Feed | 152 | 1044.7 | −60.0 | V | 14.528 | 28.044 | — | — | 2598.3 |
| Expanded Recycle | 153 | 100.0 | −233.0 | V | 12.077 | 28.044 | — | — | 2598.3 |
| Compressor Feed | 144 | 90.0 | 105.0 | V | 18.399 | 28.044 | — | — | 2598.3 |
| Compressor Discharge | 151 | 1049.7 | 110.0 | V | 26.570 | 28.044 | — | — | 3809.5 |
| Sub-cooled N$_2$ | 109 | 1009.7 | −320.0 | L | 2.159 | 28.044 | — | — | 1211.2 |

| STREAM | Stream Composition (Vol. %) | | | | | | |
|---|---|---|---|---|---|---|---|
| | H$_2$ | CO | CH$_4$ | C$_2$H$_6$ | C$_2$H$_4$ | N$_2$ | Ar |
| Feedstream | 61.147 | 22.223 | 15.939 | 0.447 | 0.112 | 0.132 | — |
| 1st Flashed Vapor | 78.405 | 17.286 | 4.187 | 0.002 | 0.002 | 0.118 | — |
| Tower Feed Vapor | 96.296 | 3.579 | 0.086 | — | — | 0.019 | — |
| Washed H$_2$ Vapor | 93.617 | 1 vppm | — | — | — | 6.374 | 0.009 |
| H$_2$ Vapor | 93.617 | 1 vppm | — | — | — | 6.374 | 0.009 |
| H$_2$ Vapor | 93.617 | 1 vppm | — | — | — | 6.374 | 0.009 |
| N$_2$ | — | — | — | — | — | 99.8 | 0.7 |
| Syn Gas Product | 74.934 | — | — | — | — | 25.019 | 0.047 |
| 1st Separator Draw | 9.301 | 37.055 | 51.242 | 1.783 | 0.441 | 0.175 | — |
| CH$_4$ Flash Vapor | 50.551 | 42.109 | 7.051 | 9 vppm | 0.001 | 0.287 | — |
| CH$_4$ Flash Liquid | 0.934 | 36.029 | 60.206 | 2.145 | 0.533 | 0.153 | — |
| CH$_4$ Product | 9.301 | 37.055 | 51.242 | 1.783 | 0.443 | 0.175 | — |
| 2nd Separator Draw | 9.605 | 69.996 | 19.960 | 0.011 | 0.008 | 0.420 | — |

TABLE I-continued

| | | | | | | | |
|---|---|---|---|---|---|---|---|
| CO Flash Vapor | 76.291 | 23.147 | 0.275 | — | — | 0.287 | — |
| CO Flash Liquid | 0.303 | 76.535 | 22.708 | 0.012 | 0.010 | 0.433 | — |
| CO Stream | 9.605 | 69.996 | 19.960 | 0.011 | 0.008 | 0.420 | — |
| CO Product | 9.605 | 69.996 | 19.960 | 0.011 | 0.008 | 0.420 | — |
| Wash Tower Bottoms | 12.994 | 73.296 | 1.761 | — | — | 11.698 | 0.251 |
| Btms Flash Vapor | 74.026 | 19.864 | 0.025 | — | — | 6.044 | 0.040 |
| Btms Flash Liquid | 0.380 | 84.339 | 2.119 | — | — | 12.684 | 0.294 |
| Btms Product | 12.994 | 73.296 | 1.761 | — | — | 11.698 | 0.251 |
| Fresh H$_2$ Feed | — | — | — | — | — | 99.8 | 0.2 |
| Expander Feed | — | — | — | — | — | 99.8 | 0.2 |
| Expanded Recycle | — | — | — | — | — | 99.8 | 0.2 |
| Compressor Feed | — | — | — | — | — | 99.8 | 0.2 |
| Compressor Discharge | — | — | — | — | — | 99.8 | 0.2 |
| Sub-cooled N$_2$ | — | — | — | — | — | 99.8 | 0.2 |

It will be obvious that various changes and modifications may be made without departing from the invention and it is intended, therefore, that all matter contained in the foregoing description shall be interpreted as illustrative only and not limitative of the invention.

What is claimed is:

1. A process for producing a hydrogen-rich gas substantially free of carbon monoxide and methane which comprises:
   (a) cooling a hydrogen-containing raw gas stream, containing hydrogen as a main constituent together with carbon monoxide and methane, in a first heat exchange zone to condense at least a major portion of said methane;
   (b) recovering and expanding said methane-containing condensate and returning the resulting cooled methane-containing vapor and liquid to said first heat exchange zone to cool additional quantities of said raw gas stream;
   (c) further cooling said cooled raw gas stream, now depleted in methane, in a second heat exchange zone to condense at least a major portion of said carbon monoxide therefrom and to form a treated hydrogen gas stream containing low levels of carbon monoxide and methane;
   (d) recovering and expanding said carbon monoxide-containing condensate and serially passing the resulting cooled carbon monoxide gas and liquid to said second heat exchange zone and thence to said first heat exchange zone to provide at least a portion of the cooling medium passed to said zones;
   (e) contacting said treated hydrogen gas stream in a nitrogen wash tower with liquid nitrogen to remove essentially all of said remaining carbon monoxide and methane therefrom, thereby forming a liquid bottoms product containing nitrogen and said removed carbon monoxide and methane impurities, and an overhead product comprising said hydrogen-rich gas containing hydrogen and nitrogen and substantially free of carbon monoxide and methane; and
   (f) expanding said liquids bottoms product and passing the resulting cooled vapor and liquid as cooling medium to a third heat exchange zone to which is also fed a nitrogen gas feedstream, wherein said nitrogen in said feedstream is liquefied to form said liquid nitrogen for use as feed to said nitrogen wash tower.

2. The process according to claim 1 wherein said hydrogen-rich gas product withdrawn from step (e) is admixed with additional quantities of nitrogen gas to form an ammonia synthesis gas.

3. The process according to claim 1 wherein at least one of (1) said cooled methane vapor and liquid produced in step (b), (2) said cooled carbon monoxide gas and liquid produced in step (d), and (3) said cooled vapor and liquid formed in step (f) are passed as a combined two-phase stream to the respective said heat exchange zone.

4. The process according to claim 1 wherein said hydrogen-containing overhead product formed in step (e) comprises from about 85 to 96 vol. % hydrogen and from about 4 to 15 vol. % nitrogen and contains less than about 0.01 vol. % of other gases.

5. The process according to claim 1 wherein said cooled methane vapor and liquid formed in step (b) are passed to said first heat exchange zone as separate streams and wherein said cooled methane vapor stream contains greater than about 50 vol. % hydrogen and is withdrawn from said first heat exchange zone and combined with said hydrogen-containing raw gas stream for feed to the process for enhanced hydrogen recovery.

6. The process according to claim 1 wherein said nitrogen gas feedstream passed to said third heat exchange zone is withdrawn from a nitrogen cooling loop wherein gaseous nitrogen is subjected to sequential expansion and recompression for cooling of the nitrogen gas in said loop to impart at least a portion of the cooling required in said third heat exchange zone for liquefaction of said cooled nitrogen gas feedstream.

7. The process according to claim 1 wherein said hydrogen-containing raw gas stream comprises from about 50 to 70 volume percent H$_2$, from about 15 to 30 volume percent CO, and from about 1 to 25 volume percent methane.

8. The process according to claim 7 wherein said hydrogen-containing raw gas stream comprises from about 60 to 70 volume percent H$_2$, from about 20 to 25 volume percent CO, and from about 10 to 20 volume percent methane.

9. The process according to claim 7 wherein said hydrogen-containing raw gas stream contains not greater than about 0.005 volume percent CO$_2$, not greater than about 0.001 volume percent H$_2$S, and a total of less than about 0.01 volume percent of impurities other than CO and methane.

10. The process according to claim 1 wherein the H$_2$ contained in said hydrogen-rich gas product withdrawn from step (e) corresponds to from 85 to 98 volume percent of the H$_2$ passed to step (a) via said hydrogen-containing raw gas stream.

11. A process for producing an ammonia synthesis gas substantially free of carbon monoxide and methane which comprises:
   (a) cooling a hydrogen-containing raw gas stream, containing from about 50 to 70 volume percent hydrogen, together with from about 15 to 30 volume percent carbon monoxide and from about 1 to 25 volume percent methane, in a first heat exchange zone to condense at least a major portion of said methane;

(b) recovering and expanding said methane-containing condensate and returning the resulting cooled methane-containing vapor and liquid to said first heat exchange zone to cool additional quantities of said raw gas stream;

(c) further cooling said cooled raw gas stream, now depleted in methane, in a second heat exchange zone to condense at least a major portion of said carbon monoxide therefrom and to form a treated hydrogen gas stream containing low levels of carbon monoxide and methane;

(d) recovering and expanding said carbon monoxide-containing condensate and serially passing the resulting cooled carbon monoxide gas and liquid to said second heat exchange zone and thence to said first heat exchange zone to provide at least a portion of the cooling medium passed to said zone;

(e) contacting said treated hydrogen gas stream in a nitrogen wash tower with liquid nitrogen to remove essentially all of said remaining carbon monoxide and methane therefrom, thereby forming a liquid bottoms product containing nitrogen and said removed carbon monoxide and methane impurities, and an overhead product comprising a hydrogen-rich gas containing hydrogen and nitrogen and substantially free of carbon monoxide and methane;

(f) expanding said liquids bottoms product and passing the resulting cooled vapor and liquid as cooling medium to a third heat exchange zone to which is also fed a nitrogen gas feedstream, wherein said nitrogen in said feedstream is liquefied to form said liquid nitrogen for use as feed to said nitrogen wash tower; and (g) admixing said hydrogen-rich gas product withdrawn from step (e) with additional quantities of nitrogen gas to form said ammonia synthesis gas.

12. The process according to claim 11 wherein at least one of (1) said cooled methane vapor and liquid produced in step (b), (2) said cooled carbon monoxide gas and liquid produced in step (d), and (3) said cooled vapor and liquid formed in step (f) are passed as a combined two-phase stream to the respective said heat exchange zone.

13. The process according to claim 11 wherein said hydrogen-containing overhead product formed in step (e) comprises from about 85 to 96 vol. % hydrogen and from about 4 to 15 vol. % nitrogen and contains less than about 0.01 vol. % of other gasses.

14. The process according to claim 11 wherein said cooled methane vapor and liquid formed in step (b) are passed to said first heat exchange zone as separate streams and wherein said cooled methane vapor stream contains greater than about 50 vol. % hydrogen and is withdrawn from said first heat exchange zone and combined with said hydrogen-containing raw gas stream for feed to the process for enhanced hydrogen recovery.

15. The process according to claim 11 wherein said nitrogen gas feedstream passed to said third heat exchange zone is withdrawn from a nitrogen cooling loop wherein gaseous nitrogen is subjected to sequential expansion and recompression for cooling of the nitrogen gas in said loop to impart at least a portion of the cooling required in said third heat exchange zone for liquefaction of said cooled nitrogen gas feedstream.

16. The process according to claim 11 wherein said hydrogen-containing raw gas stream comprises from about 60 to 70 volume percent $H_2$, from about 20 to 25 volume percent CO, and from about 10 to 20 volume percent methane.

17. The process according to claim 11 wherein said hydrogen-containing raw gas stream contains not greater than about 0.005 volume percent $CO_2$, not greater than about 0.001 volume percent $H_2S$, and a total of less than about 0.01 volume percent of impurities other than CO and methane.

18. The process according to claim 11 wherein the $H_2$ contained in said hydrogen-rich gas produce withdrawn from step (e) corresponds to from 85 to 98 volume percent of the $H_2$ passed to step (a) via said hydrogen-containing raw gas stream.

* * * * *